United States Patent
Ko et al.

(10) Patent No.: US 9,380,283 B2
(45) Date of Patent: Jun. 28, 2016

(54) DISPLAY APPARATUS AND THREE-DIMENSIONAL VIDEO SIGNAL DISPLAYING METHOD THEREOF

(75) Inventors: Chang-seog Ko, Hwaseong-si (KR); Ji-youn Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 726 days.

(21) Appl. No.: 12/779,403

(22) Filed: May 13, 2010

(65) Prior Publication Data

US 2011/0074934 A1    Mar. 31, 2011

(30) Foreign Application Priority Data

Sep. 28, 2009  (KR) .................... 10-2009-0091643

(51) Int. Cl.
- *G06F 3/01* (2006.01)
- *G06T 15/00* (2011.01)
- *H04N 13/00* (2006.01)
- *H04N 5/76* (2006.01)
- *H04N 13/02* (2006.01)
- *H04N 13/04* (2006.01)

(52) U.S. Cl.
CPC ......... *H04N 13/0003* (2013.01); *H04N 13/007* (2013.01); *H04N 13/0048* (2013.01); *H04N 13/0452* (2013.01); *H04N 13/0497* (2013.01); *H04N 2213/007* (2013.01)

(58) Field of Classification Search
CPC ............ H04N 13/003; H04N 13/0048; H04N 13/0452; H04N 13/0497; H04N 13/007; H04N 2213/007

USPC .......................................................... 348/51
See application file for complete search history.

(56) References Cited

U.S. PATENT DOCUMENTS

| | | | |
|---|---|---|---|
| 6,574,423 B1 | 6/2003 | Oshima et al. | |
| 2003/0131357 A1 | 7/2003 | Kim | |
| 2008/0301728 A1* | 12/2008 | Hong et al. ................ | 725/38 |
| 2009/0005011 A1* | 1/2009 | Christie et al. ............ | 455/412.2 |
| 2009/0142041 A1 | 6/2009 | Nagasawa et al. | |
| 2009/0185029 A1* | 7/2009 | Mitsuhashi et al. ........... | 348/46 |

(Continued)

FOREIGN PATENT DOCUMENTS

| | | |
|---|---|---|
| EP | 0860807 A2 | 8/1998 |
| EP | 1 781 046 A1 | 5/2007 |
| JP | 10-224825 A | 8/1998 |

(Continued)

OTHER PUBLICATIONS

Communication dated Sep. 25, 2013 from European Patent Office in counterpart European Patent Application No. 10173975.3.

(Continued)

*Primary Examiner* — Hee-Yong Kim
(74) *Attorney, Agent, or Firm* — Sughrue Mion, PLLC

(57) ABSTRACT

An apparatus and method which display a three dimensional (3D) video signal, the apparatus comprising: a receiver which receives a video signal; a video signal processor which processes the received video signal; a display unit which displays thereon the processed video signal; and a controller which, in response to the received video signal being a 3D video signal, controls the video signal processor to convert the received 3D video signal into a two dimensional (2D) video signal, and displays the 2D video signal on the display unit.

19 Claims, 6 Drawing Sheets

(56) References Cited

U.S. PATENT DOCUMENTS

| | | | |
|---|---|---|---|
| 2010/0074594 A1* | 3/2010 | Nakamura et al. | 386/92 |
| 2011/0012896 A1* | 1/2011 | Ji | 345/419 |

FOREIGN PATENT DOCUMENTS

| | | |
|---|---|---|
| JP | 1175223 A | 3/1999 |
| JP | 2002-221928 A | 8/2002 |
| JP | 2003-250104 A | 9/2003 |
| JP | 2003-530032 A | 10/2003 |
| JP | 2006-121553 A | 5/2006 |
| JP | 2006-332985 A | 12/2006 |
| JP | 2006-352877 A | 12/2006 |
| JP | 2007-166651 A | 6/2007 |
| JP | 2009-135686 A | 6/2009 |
| KR | 100709423 B1 | 4/2007 |
| KR | 100750670 B1 | 8/2007 |
| KR | 100828358 B1 | 5/2008 |
| WO | 97/32437 A1 | 9/1997 |
| WO | 01/76248 A2 | 10/2001 |

OTHER PUBLICATIONS

Communication from the European Patent Office issued Feb. 14, 2014 in a counterpart European Application No. 10173975.3.
Communication from the Japanese Patent Office dated Apr. 8, 2014, in a counterpart Japanese application No. 2010-209238.
Communication dated Jun. 19, 2015, issued by the Korean Intellectual Property Office in counterpart in Korean Application No. 10-2009-0091643.
Communication dated Dec. 2, 2014, issued by the Japanese Intellectual Property Office in counterpart Japanese Application No. 2010-209238.
Communication issued Jan. 7, 2016, issued by the Korean Intellectual Property Office in counterpart Korean Patent Application No. 10-2009-0091643.
Communication issued Feb. 24, 2016, issued by the Korean Intellectual Property Office in counterpart Korean Patent Application No. 10-2009-0091643.
Communication dated Apr. 26, 2016, issued by the Japanese Patent Office in counterpart Japanese Application No. 2010-209238.

* cited by examiner

DISPLAY APPARATUS AND THREE-DIMENSIONAL VIDEO SIGNAL DISPLAYING METHOD THEREOF

CROSS-REFERENCE TO RELATED APPLICATION

This application claims priority from Korean Patent Application No. 10-2009-0091643, filed on Sep. 28, 2009 in the Korean Intellectual Property Office, the disclosure of which is incorporated herein by reference.

BACKGROUND

1. Field

Aspects of the present general inventive concept relate to a display apparatus and a three dimensional (3D) video signal displaying method thereof, and more particularly, to a display apparatus and a 3D video signal displaying method thereof which displays a two dimensional (2D) video signal on a display unit and converts the 2D video signal into a 3D video signal by a user's selection even if the 3D video signal is received.

2. Description of the Related Art

With increased demand for 3D video contents, a 3D video display apparatus has drawn much attention. However, current 3D video display apparatuses that do not recognize a 3D video signal fail to display a video in a 2D format. Rather, a user may view a left eye video and a right eye video from top to bottom or side by side in a single screen simultaneously, or view an opaque image. To view a 3D video correctly, the user should set a 3D format through a user input unit. In particular, even if the 3D video display apparatus recognizes a 3D image, the user should set the 3D video format through the user input unit to correctly view the 3D image.

Accordingly, a 3D video display apparatus that has a 3D video format set displays the 3D video if the 3D video signal is received. However, in the case of a glasses type 3D display apparatus (i.e., a 3D display apparatus that requires use of glasses), a user that does not wear the glasses may enjoy a displayed 3D video less than a 2D image. Further, the user may not recognize the 3D video or may recognize the 3D video as a ghost phenomenon. Even if the user recognizes the 3D video correctly, he/she should convert the 3D video into a 2D video through the user input unit to view the 2D video.

SUMMARY

Aspects of the present general inventive concept provide a display apparatus and a 3D video signal displaying method thereof which displays a 2D video signal first, even if a 3D video signal is received.

Additional aspects of the present general inventive concept will be set forth in part in the description which follows and, in part, will be obvious from the description, or may be learned by practice of the present invention.

According to an aspect of the present inventive concept, there is provided a display apparatus including: a receiver which receives a video signal; a video signal processor which processes the received video signal; a display unit which displays thereon the processed video signal; and a controller which, in response to the received video signal being a three dimensional (3D) video signal, controls the video signal processor to convert the received 3D video signal into a two dimensional (2D) video signal prior to the display unit displaying the received video signal, and displays the 2D video signal on the display unit.

According to another aspect of the present inventive concept, there is provided a three dimensional (3D) video signal displaying method of a display apparatus, the method including: receiving, by a receiver, a 3D video signal; processing, by a video signal processor, the received 3D video signal to generate a 2D video signal therefrom prior to displaying the received 3D video signal; and displaying, on a display unit, the processed 2D video signal.

According to another aspect of the present inventive concept, there is provided a video signal processor for a display apparatus, the video signal processor including: a detector which detects a display format of a received video signal; and a converter which converts the received video signal to a two dimensional (2D) video signal if the detected display format of the received video signal is a three dimensional (3D) format, and which outputs the converted 2D video signal to be displayed prior to any displaying of the received video signal by the display apparatus.

According to another aspect of the present inventive concept, there is provided a video signal processing method for a display apparatus, the method including: converting a received three dimensional (3D) video signal to a two dimensional (2D) video signal; and outputting the converted 2D video signal to be displayed prior to any displaying of the 3D video signal by the display apparatus.

BRIEF DESCRIPTION OF THE DRAWINGS

The above and/or other aspects of the present inventive concept will become apparent and more readily appreciated from the following description of the embodiments, taken in conjunction with the accompanying drawings of which.

DETAILED DESCRIPTION OF EXEMPLARY EMBODIMENTS

Hereinafter, exemplary embodiments of the present inventive concept will be described with reference to accompanying drawings, wherein like numerals refer to like elements and repetitive descriptions will be avoided as necessary.

Figure 1:
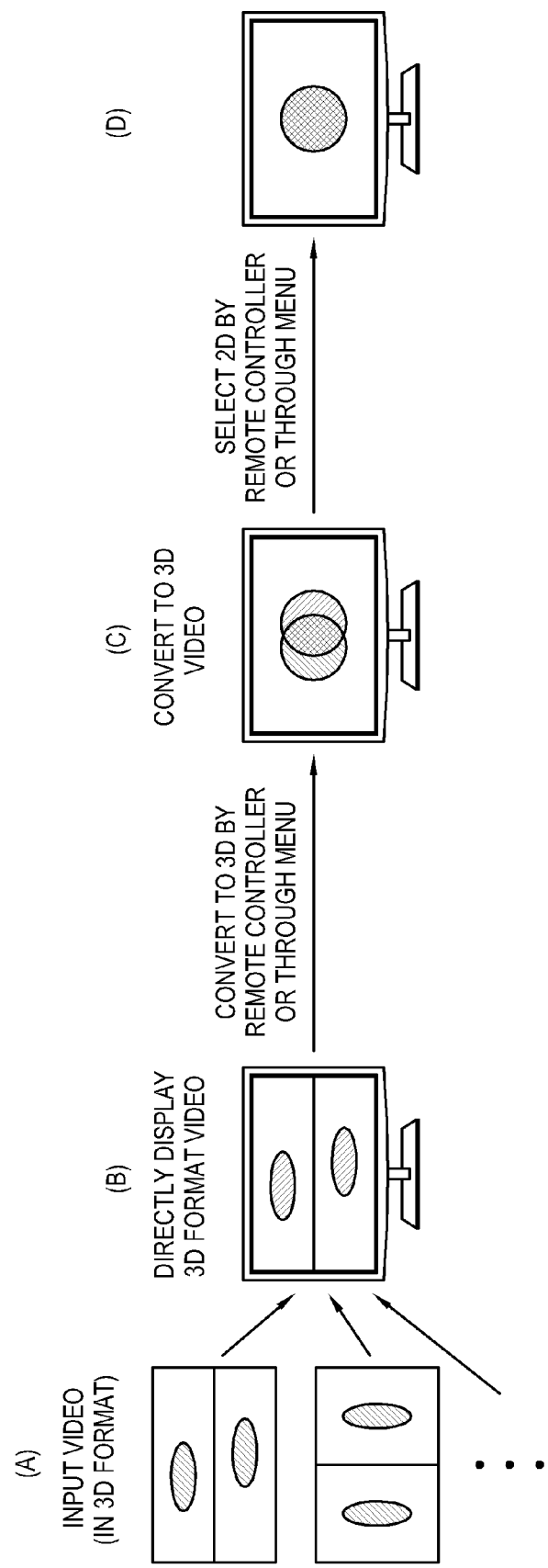
FIG. 1 illustrates an example of displaying a three dimensional (3D) video signal by a related art 3D video display apparatus.

FIG. 1 illustrates an example of displaying a three dimensional (3D) video signal of a related art 3D video display apparatus. Referring to FIG. 1, if a 3D video signal is received (A), the related art 3D video display apparatus displays separately a left eye video and a right eye video in a 3D format (B). Accordingly, a user may not clearly view an image. A user should directly convert the video into a 3D video through a user input unit to view the 3D video signal correctly (C). However, even if a user desires to view a 2D image, the related art 3D video display apparatus first displays a 3D video and then converts the 3D video into a 2D video only by a user's selection through the user input unit (D). That is, the related art 3D video display apparatus does not directly convert the 3D video signal into a 2D video signal. Accordingly, aspects of the present general inventive concept provide a display apparatus that immediately converts a received 3D video signal into a 2D video signal and displays the 2D video signal.

Figure 2:
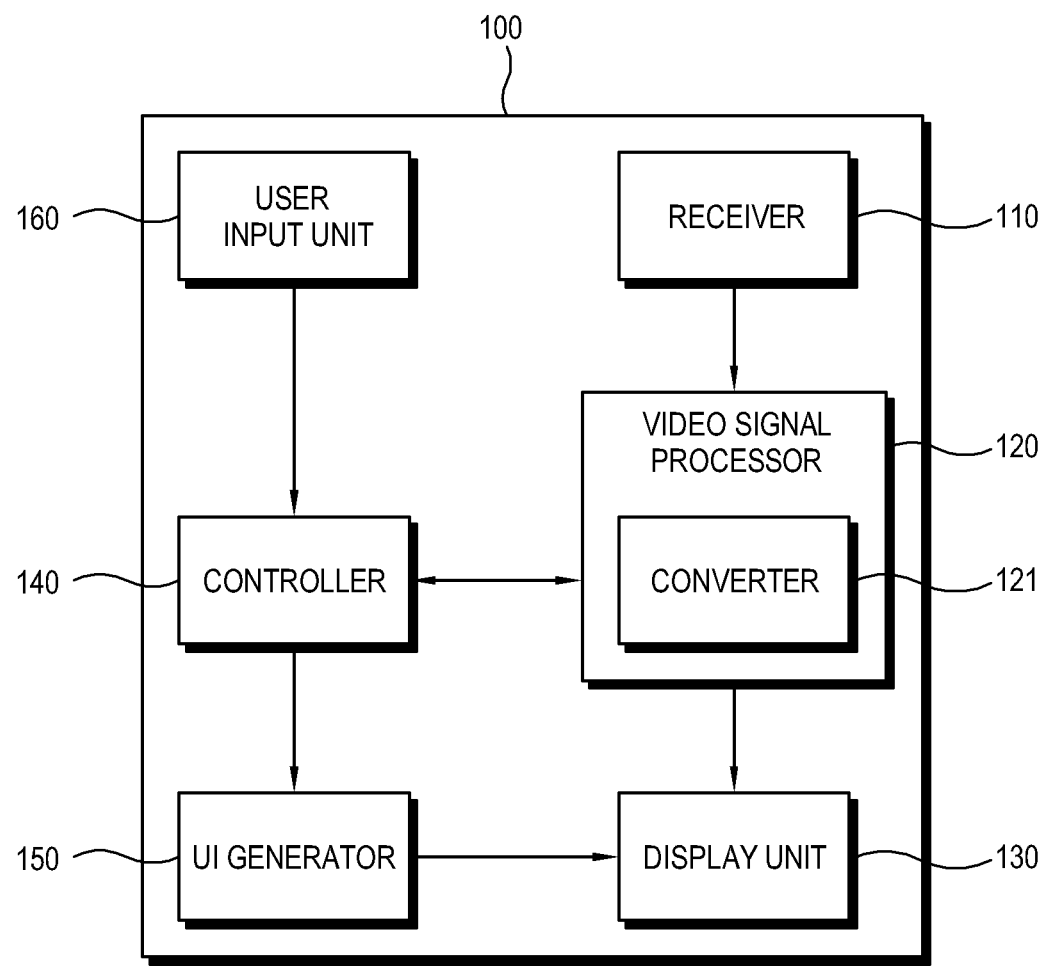
FIG. 2 is a block diagram of a display apparatus according to an exemplary embodiment of the present inventive concept.

FIG. 2 is a block diagram of a display apparatus 100 according to an exemplary embodiment of the present inventive concept. Referring to FIG. 2, the display apparatus 100 includes a receiver 110, a video signal processor 120, a display unit 130, a controller 140, a UI generator 150, and a user input unit 160.

The receiver 110 receives a video signal from an outside source. For example, the receiver 110 may receive a broadcasting signal from a broadcasting station or a video signal from any type of external device transmitting a video signal, such as a personal computer (PC), a digital versatile disc (DVD) or Blu-ray disc (BD) player, a personal video recorder (PVR), etc.

The video signal processor 120 processes the received video signal. The video signal may include a 2D video signal and a 3D video signal. The video signal processor 120 may include a detector (not shown) to detect the type of the received video signal. Specifically, the detector may detect display format data included, for example, in meta data of the received video signal. If the format data does not exist, the detector may analyze the display format of the received video signal and detect a 2D or a 3D video signal. If the received video signal includes a 3D video signal, the detector may detect the type of the 3D video signal. The display format of the 3D video signal may include one of top and bottom, side by side, frame packing, check board, line by line, and column interleaving.

The top and bottom format is a video format encoding a left eye video and a right eye divided into two parts from top to bottom with respect to a single frame. The side by side format is a video format encoding a left eye video and a right eye video divided side by side with respect to a single frame. The frame packing format is a video format encoding a left eye video and a right eye video forming a single frame respectively. The check board format is a video format alternately arranging left eye pixels and right eye pixels in a check board pattern. The line by line format is a video format encoding alternately one horizontal line for a left eye video and one horizontal line for a right eye video from top to bottom with respect to a single frame. The column interleave format is a video format encoding alternately a left eye column and a right eye column in a single pixel width from left to right with respect to a single frame. Accordingly, the detector may analyze and detect the format of the 3D video signal.

The video signal processor 120 further includes a converter 121. If a conversion into a 2D video signal is selected by a user through the user input unit 160 while the 3D video signal is being displayed, the converter 121 converts the 3D video signal into a 2D video signal. Similarly, if a conversion into a 3D video signal is selected by a user through the user input unit 160 while the 2D video signal is being displayed, the converter 121 converts the 2D video signal into a 3D video signal. If an original format of the 2D video signal is not a 3D video signal, the converter 121 may generate a virtual 3D image. For example, when the 3D video signal is received, the converter 121 may obtain information on the format of the 3D video signal from the detector and extract only a left eye video in accordance with the format to generate a 2D video signal or extract only a right eye video to generate a 2D video signal.

The display unit 130 may include various display panels including a liquid crystal display (LCD), a light emitting diode (LED), a plasma display panel (PDP), an organic light emitting diode (OLED), etc. to display thereon a video signal received from the outside source.

The display apparatus 100 may further include an audio signal processor (not shown) and a speaker (not shown) to process an audio signal received from the outside and to output the audio signal to the speaker or an external device.

The UI generator 150 generates a 2D/3D conversion UI, which is displayed on the display unit 130 by the controller 140. The 2D/3D conversion UI may be included in an information displaying area displaying information of a screen of a 2D image.

The user input unit 160 is provided to receive a user selection of the generated UI. The user input unit 160 may include various devices and/or implement various methods to receive inputs for the UI displayed on the display unit 130. For example, the user input unit 160 may include a button provided in the display apparatus 100, a touch panel for a touch screen, a remote controller connected to the display apparatus 100 in a wired/wireless manner, and/or a keyboard.

If a 3D video signal is received through the receiver 110, the controller 140 controls the video signal processor 120 to process the 3D video signal to generate a 2D video signal and controls the display unit 130 to display the 2D video signal thereon. The controller 140 may further control the UI generator 150 to generate the 2D/3D conversion UI and control the display unit 130 to display thereon the generated UI. If the user selects, via the user input unit 160, the generated UI, the controller 140 controls the video signal processor 120 to convert the video signal to the selected video format, i.e., into a 2D or 3D video signal to be displayed on the display unit 130. For example, if a 3D video signal is received, the controller 130 controls the video signal processor 120 to extract only a left eye video from the received 3D video signal to generate a 2D video signal or extract only a right eye video from the 3D video signal to generate a 2D video signal to thereby display the converted video signal on the display unit 130.

Figure 3:
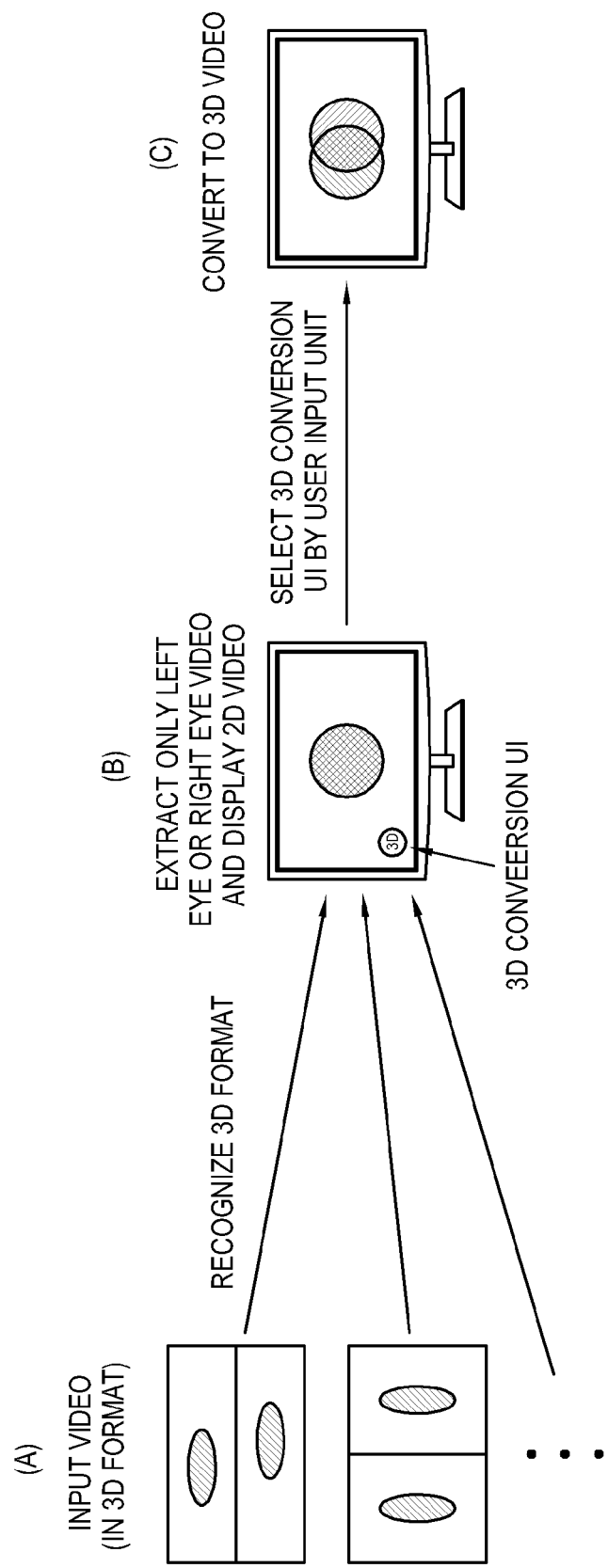
FIG. 3 illustrates an example of displaying a 3D video according to an exemplary embodiment of the present inventive concept.

FIG. 3 illustrates an example of displaying a 3D video according to an exemplary embodiment of the present inventive concept. Referring to FIG. 3, if a 3D video signal in one of various 3D video formats is received through the receiver 110 (A), the detector of the video signal processor 120 detects format information of the received 3D video signal and transmits the video signal to the converter 121. Then, the converter 121 extracts a left eye signal or a right eye signal from the 3D video signal and generates a 2D video signal to display the video signal on the display unit 130 (B). The controller 140 controls the UI generator 150 to generate a UI for selecting a conversion of the 2D video into a 3D video and displays the UI on the display unit 130 (B). If the 3D conversion UI is selected by the user through the user input unit 160, the controller 140 controls the video signal processor 120 to process and display the received 3D video signal on the display unit 130 (C).

According to aspects of the present inventive concept, if a 3D video signal is received by turning on the display apparatus 100 or by changing a channel, a 2D video signal, and not the 3D video signal, is displayed on the display unit 130. Then, the 3D video signal is displayed thereon according to a user's selection. If the 3D video signal is displayed first, the user may not recognize the 3D video signal or recognize it as a ghost phenomenon. Also, the user should wear glasses to view the 3D video or the user's eyes may feel tired. Thus, some users avoid 3D images. Accordingly, even if a 3D video signal is received, the display apparatus 100 according to aspects of the present inventive concept displays a 2D video first, and then displays a 3D video only when a user desires.

Figure 4:
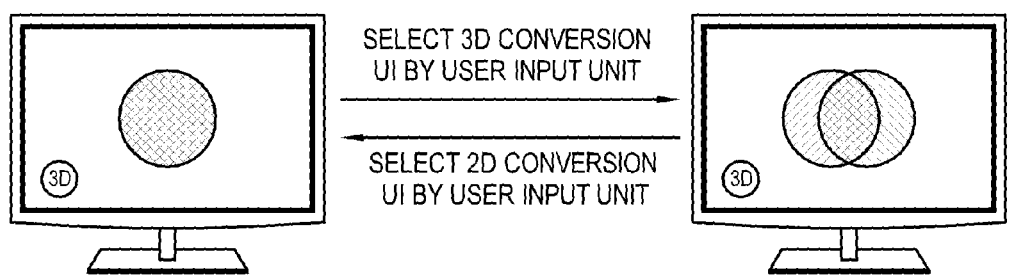
FIG. 4 illustrates an example of a 2D/3D conversion user interface (UI) according to an exemplary embodiment of the present inventive concept.

FIG. 4 illustrates an example of a 2D/3D conversion UI according to an exemplary embodiment of the present inventive concept. Referring to FIG. 4, if the display unit 130 displays thereon a 2D image, the controller 140 controls the UI generator 150 to generate a 3D conversion UI and display the UI on the display unit 130. Subsequently, the 2D video may be converted into a 3D video by the user's selection. If the display unit 130 displays thereon a 3D image, the controller 140 controls the UI generator 150 to generate a 2D conversion UI and display the UI on the display unit 130. Then, the 3D video may be converted into a 2D video by the user's selection. In the current exemplary embodiment, the 3D conversion UI and the 2 D conversion UI are displayed as "3D" equally, though it is understood that all embodiments are not limited thereto. If the 3D conversion UI is selected, the 2D video is converted into a 3D image or the 3D video is converted into a 2D video. According to aspects of the present inventive concept, a 3D video and a 2D video are converted easily by selection of the UI and user's convenience is enhanced. Furthermore, the generated 2D/3D conversion UI may be displayed on the display unit 130 only during a predetermined time, since the UI may interfere with a user's viewing if displayed on the display unit 130 consistently.

Figure 5:
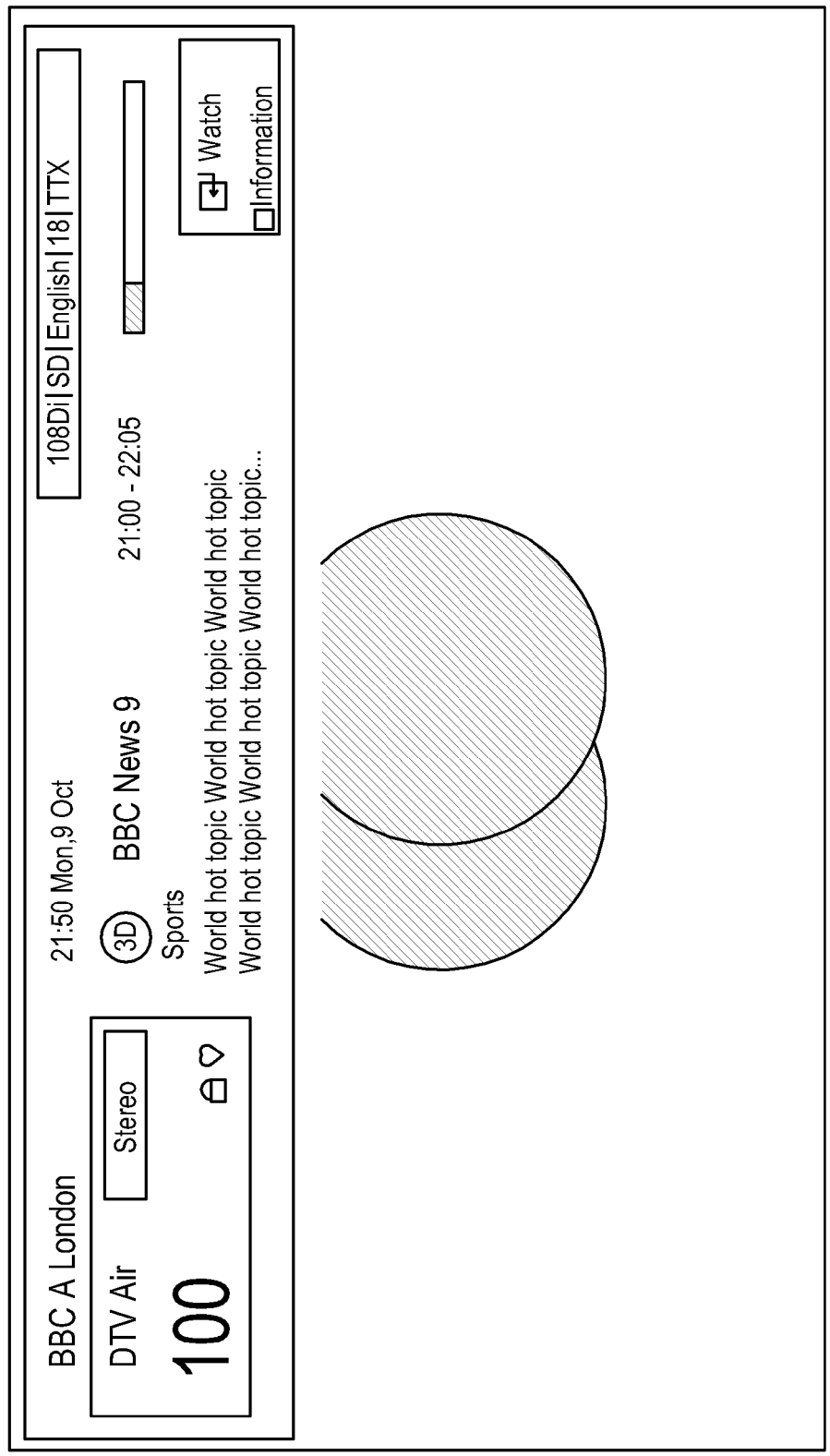
FIG. 5 illustrates another example of a 2D/3D conversion UI according to another exemplary embodiment of the present inventive concept.

FIG. 5 illustrates an example of a 2D/3D conversion UI according to another exemplary embodiment of the present inventive concept. As described above with reference to FIG. 4, the generated 2D/3D conversion UI may be displayed on the display unit 130 only during a predetermined time, and disappears therefrom after the predetermined time. As shown in FIG. 5, if a user views a 2D or 3D video and desires to convert the image, a user may select an information menu of the video through the user input unit 160. Then, the information menu displays information on whether the video is 2D or 3D together with a 3D video conversion UI if the video is a 2D video, or a 2D video conversion UI if the video is a 3D video. Accordingly, a user may easily convert a format of the video and view the image.

Figure 6:
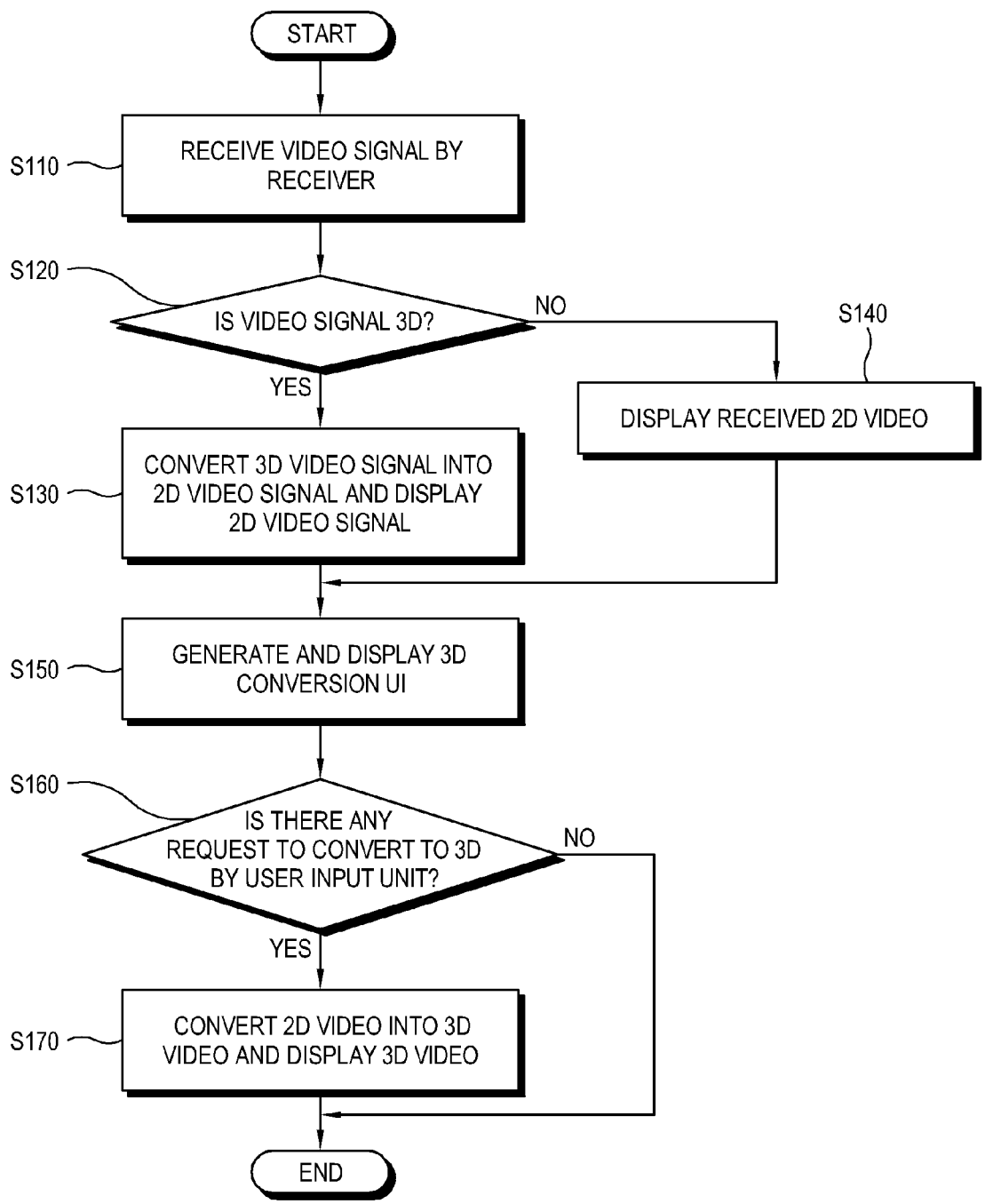
FIG. 6 is a flowchart which illustrates a 3D video signal displaying method of a display apparatus according to an exemplary embodiment of the present inventive concept.

FIG. 6 is a flowchart that illustrates a 3D video signal displaying method of a display apparatus 100 according to an exemplary embodiment of the present inventive concept. The 3D video signal displaying method of the display apparatus 100 includes receiving a 3D video signal by a receiver; processing the received 3D video signal to generate a 2D video signal by a video signal processor 120; and displaying the processed 2D video signal on a display unit 130. The method further includes generating a 2D/3D video conversion UI and displaying the UI on the display unit 130 to receive a user's selection, and further includes converting the 2D video signal into a 3D video signal and displaying the 3D video signal on the display unit 130 if the UI is selected by the user through the user input unit 160. The processing of the video signal includes extracting a left eye video signal or a right eye video signal from the received 3D video signal and converting the video signal into a 2D video signal. The method may further include detecting a display format or format information data of the received 3D video signal by the video signal processor 120.

Referring to FIG. 6, the video signal is received through the receiver 110 in operation S110. Accordingly, the detector of the video signal processor 120 detects the format information data or the format of the received video signal and determines whether the video signal is a 2D video signal or a 3D video signal in operation S120. If it is determined that the video signal is a 3D video signal, the detector determines the format of the 3D video signal.

If it is determined by the detector that the video signal is a 3D video signal (Yes in operation S120), the converter 121 of the video signal processor 120 extracts a left eye video signal or a right eye video signal from the 3D video signal, generates a 2D video signal, and displays the 2D video signal on the display unit 130 in operation S130.

Conversely, if it is determined that the received video signal is a 2D video signal (No in operation S120), the 2D video signal is directly displayed on the display unit 130 in operation 5140.

The display unit 130, which displays the 2D video signal thereon, displays the 3D conversion UI generated by the UI generator 150 in operation S150.

If the displayed 3D conversion UI is selected by the user input unit in operation S160, the video signal processor 120 processes the original 3D video signal to be displayed on the display unit 130 in operation S170. If the original format of the 2D video signal which is being displayed is not a 3D video signal, the converter 121 of the video signal processor 120 converts the 2D video signal into a virtual 3D video signal and displays the virtual 3D video signal on the display unit 130 in operation S170.

While not restricted thereto, aspects of the present inventive concept can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Moreover, while not required in all aspects, one or more units of the display apparatus 100 can include a processor or microprocessor executing a computer program stored in a computer-readable medium. Also, the exemplary embodiments of the present inventive concept can be written as computer programs transmitted over a computer-readable transmission medium, such as a carrier wave, and received and implemented in general-use digital computers that execute the programs.

Although a few exemplary embodiments of the present inventive concept have been shown and described, it will be appreciated by those skilled in the art that changes may be made in these exemplary embodiments without departing from the principles and spirit of the invention, the scope of which is defined in the appended claims and their equivalents.

What is claimed is:

1. A method of driving a display apparatus, the method comprising:
   receiving a video signal;
   displaying a two-dimensional (2D) image based on the received video signal in response to the received video signal being determined to a 2D video signal;
   converting the received video signal into a 2D format in response to the received video signal being determined to be a three-dimensional (3D) video signal; and;
   displaying a 2D image based on the converted 2D format on a display unit,
   wherein the displaying the 2D image based on the converted 2D format on the display unit comprises:

displaying a 2D/3D conversion user interface (UI) which can be selected by a user while the 2D image is displayed;
receiving a user selection of the 2D/3D conversion UI through a user input unit; and
displaying an image in a selected video format according to the user selection on the display unit.

2. The method according to claim 1, wherein the 2D image is displayed in response to the 3D video signal being received by one of turning on the display apparatus and changing a channel of the display apparatus.

3. The method according to claim 1, further comprising:
generating the user interface (UI) enabling a selective conversion of a display format of the received video signal.

4. The method according to claim 1, further comprising:
discontinuing the displaying of the UI after a predetermined period of time.

5. The method according to claim 1, wherein the 2D/3D conversion UI is a 2D-to-3D conversion user interface (UI) to convert the 2D video signal into a three-dimensional (3D) video signal and
wherein the method further comprises displaying a 3D-to-2D conversion UI if a 3D image is displayed by selection of the 2D-to-3D conversion UI.

6. The method according to claim 5, wherein, in response to selection of the 2D-to-3D conversion UI, the received video signal is processed by outputting the received video signal.

7. The method according to claim 5, wherein, in response to the selection of the 3D-to-2D conversion UI, the received video signal is processed by extracting one of a left eye video signal and a right eye video signal of the 3D video signal.

8. The method according to claim 5, further comprising:
displaying a 3D image by converting the 2D video signal into a 3D video signal according to selection of the 2D-to-3D conversion UI.

9. The method according to claim 5, further comprising:
displaying a 2D image by converting a display format of the received video signal into a 2D display format according to the selection of the 3D-to-2D conversion UI.

10. The method according to claim 1, wherein the received video signal is converted into the 2D video signal by extracting one of a left eye video signal and a right eye video signal of the 3D video signal and generating the 2D video signal from the extracted video signal.

11. The method according to claim 1, wherein the received video signal is determined to be a 3D video signal by detecting information of a display format of the received video signal.

12. The method according to claim 11, wherein the display format is one of a top and bottom format, a side by side format, a frame packing format, a checkerboard format, a line by line format, and a column interleave format.

13. The method according to claim 1, wherein the converting is performed by a processor of the display apparatus.

14. A non-transitory computer-readable recording medium on which is recorded a program executable by a computer for performing a method of driving a display apparatus, the method comprising:
receiving a video signal;
displaying a two-dimensional (2D) image based on the received video signal in response to the received video signal being determined to be a 2D video signal;
converting the received video signal into a 2D format in response to the received video signal being determined to be a three-dimensional (3D) video signal; and
displaying a 2D image based on the converted 2D format on a display unit,
wherein the displaying the 2D image based on the converted 2D format on the display unit comprises:
displaying a 2D/3D conversion user interface (UI) which can be selected by a user while the 2D image is displayed;
receiving a user selection of the 2D/3D conversion UI through a user input unit; and
displaying an image in a selected video format according to the user selection on the display unit.

15. A video signal processor comprising:
a receiver to receive a video signal; and
a converter to output the received video signal to a display unit in response to the received signal being determined to be a two-dimensional (2D) video signal, and to convert the received video signal into a 2D video signal in response to the received video signal being determined to be a three-dimensional (3D) and output the converted 2D video signal to the display unit,
wherein the video signal processor displays a 2D image based on the converted 2D video signal on the display unit, displays a 2D/3D conversion user interface (UI) which can be selected by a user on the display unit while the 2D image is displayed on the display unit, receives a user selection of the 2D/3D conversion UI through a user input unit, and displays an image in a selected video format according to the user selection on the display unit.

16. A display apparatus comprising:
a display unit;
a user input unit;
a video signal processor to output a received video signal to the display unit in response to the received video signal being determined to be a two-dimensional (2D) video signal, and to convert the received video signal into a 2D video signal in response to the received video signal being determined to be a three-dimensional (3D) and output the converted 2D video signal to the display unit; and
a controller to control the display unit to display a 2D image based on the converted 2D video signal and a 3D conversion user interface (UI) which can be selected by a user while the 2D image is displayed, to control the user input unit to receive a user selection, to control the video signal processor to convert an image into a video format according to the user selection, and to control the display unit to display the image in a video format according to the user selection.

17. The display apparatus according to claim 16, wherein the controller is configured to control the display unit to display the 2D image in response to the display apparatus receiving the 3D video signal by one of turning on the display apparatus and changing a channel of the display apparatus.

18. The display apparatus according to claim 16, further comprising:
a user interface (UI) generator to generate the 2D/3D conversion UI enabling selection of a 2D-to-3D conversion if the display unit displays a 2D image and enabling selection of a 3D-to-2D conversion if the display unit displays a 3D image,
wherein, for the 2D-to-3D conversion, the received 3D video signal is processed by outputting the received video signal, and wherein, for the 3D-to-2D conversion, the received 3D video signal is processed by extracting one of a left eye video signal and a right eye video signal of the 3D video signal.

19. The display apparatus according to claim 16, wherein the display unit comprises a 3D display unit capable of displaying the 3D video signal.

* * * * *